United States Patent [19]

Snaper et al.

[11] 4,140,370
[45] Feb. 20, 1979

[54] PLANAR OPTICAL VIEWING SCREENS AND LENSES

[76] Inventors: Alvin A. Snaper, 2800 Cameo Cir., Las Vegas, Nev. 89107; Carlos A. Agnesi, Vallarta 2510, Guadalajara, Mexico

[21] Appl. No.: 796,377

[22] Filed: May 12, 1977

[51] Int. Cl.² ............... G03B 21/60; G02B 27/24
[52] U.S. Cl. ................................ 350/128; 350/137; 350/144; 352/86
[58] Field of Search ............ 350/127, 128, 129, 144, 350/137; 352/86

[56] References Cited

U.S. PATENT DOCUMENTS

| 2,268,351 | 12/1941 | Tanaka | 350/144 X |
| 2,313,947 | 3/1943 | Klinkum | 350/127 |
| 2,631,496 | 3/1953 | Rehorn | 350/129 X |
| 2,884,833 | 5/1959 | Pohl | 350/128 |
| 2,888,855 | 6/1959 | Tanaka | 350/127 X |
| 3,597,042 | 8/1971 | Favre | 352/86 X |

*Primary Examiner*—Richard A. Wintercorn
*Attorney, Agent, or Firm*—Seiler & Quirk

[57] ABSTRACT

An apparatus for producing a simulated three-dimensional psycho-image from a conventional two-dimensional image comprises a screen of transparent material having integral, alternate layers of materials with varying optical properties which enhance image contrast and provide an image bisection to produce an illusion of a three dimensional scene without the need for supplemental viewing glasses or similar devices. Alternate embodiments simulate Fresnel lens performance and provide color conversion.

15 Claims, 14 Drawing Figures

PLANAR OPTICAL VIEWING SCREENS AND LENSES

BACKGROUND OF THE INVENTION

It has been known to use multiple image sources for the creation of steroscopic and three dimensional image projections, both in motion picture projections and television projections. These systems all involve complicated projections and cathode ray tube equipment for double image projection arrangements. The present system proposes to employ a simple novel screen method and apparatus for creating a substantially enhanced three dimensional effect for the viewer.

SUMMARY OF THE INVENTION

The invention is directed to various means for altering the image produced by a two-dimensional light source to give the appearance of a three-dimensional source. A transparent optical viewing screen comprises alternating, vertically oriented courses of clear transparent material and louvers or filters of actinic transparent material. An actinic transparent material is one which alters light passing through it by absorbing portions of the visible spectrum to produce an image having a color contrast with images which pass only through the clear transparent material. Since the light sensors in the retina of the eye are sensitive to the color contrast introduced in this manner, the contrast heightens the image separation attained with the overall viewing screen discussed above. To further enhance the image separation, at least one of the screen faces may comprise louvered or embossed, or clear, transparent cover sheets may be embossed or molded to provide a lenticular lens pattern.

By replacing the louvers or filters of actinic transparent material with louvers of clear transparent material having a refractive index substantially different from the alternating courses, a transparent sheet is obtained which will have optical properties similar to conventional lenses and Fresnel lenses, depending on the refractive index pattern design of the alternating courses. By replacing the louvers or filters of actinic transparent material with louvers of various birefringent materials, a screen is obtained which will transmit a color image when stimulated by a polarized light source, even black and white. The basic principles involved in the use of such birefringent materials are more fully described in U.S. Pat. No. 3,391,296 "Color Producing Tube Having Screen Containing Plurality of Birefringent Materials" and U.S. Pat. No. 3,488,105 "Color-Producing Apparatus", both patents granted to A. A. Snaper, co-inventor herein.

An object of this invention is to provide a flat or contoured optical screen which may be placed in front of any black and white or color television set or other two-dimensional image producing screen or means, to produce an apparent three-dimensional effect.

A further object of this invention is to produce an economical optical screen for use with television receivers and the like to add sufficient depth, contrast enhancement and dimension to the image to increase the viewer's enjoyment thereof.

A further object is to provide an optical sheet or screen suitable for use in minimizing glare from surfaces to which it is attached such as mirrors and instrument panels and in controlling light transmission such as through windows or sun shades, by breaking up the transmitted light.

A further object is to provide planar lenses which operate in accordance with the differentially refractive characteristics of their constituent materials, rather than with the surface geometry of the lens.

Yet another object is to provide an optical screen comprising birefringent filters which may be placed in front of any black and white image source to produce a three-dimensional colored image therefrom, when used in conjunction with a polarizing filter between the source and the optical screen and polarizing analyzer between the optical screen and the viewer.

Still another object of this invention is to provide a means for easily attaching the previously discussed optical screens to a conventional television viewing screen.

BRIEF DESCRIPTION OF THE DRAWINGS

FIG. 2 shows an enlarged edge view of the optical screen 10 in FIG. 1, indicating the construction of the screen;

FIG. 3 shows a modification of the device of FIG. 2, including lenticules in register with the louvers or filters of actinic transparent material;

FIG. 4 shows a modification of the device of FIG. 2, including lenticules in register with the courses of clear transparent material;

FIG. 5 shows an enlarged edge view of a planar optical lens in accordance with the invention;

DETAILED DESCRIPTION OF THE INVENTION

The invention comprises an optical viewing screen or lens having alternating vertical courses of clear transparent material and filters or louvers of actinic or other material of suitable optical characteristics. The alternating courses or louvers are of essentially plane rectangular configuration and usually, but not necessarily, intersect the surface planes of the view screen or lens at right angles.

Figure 1:
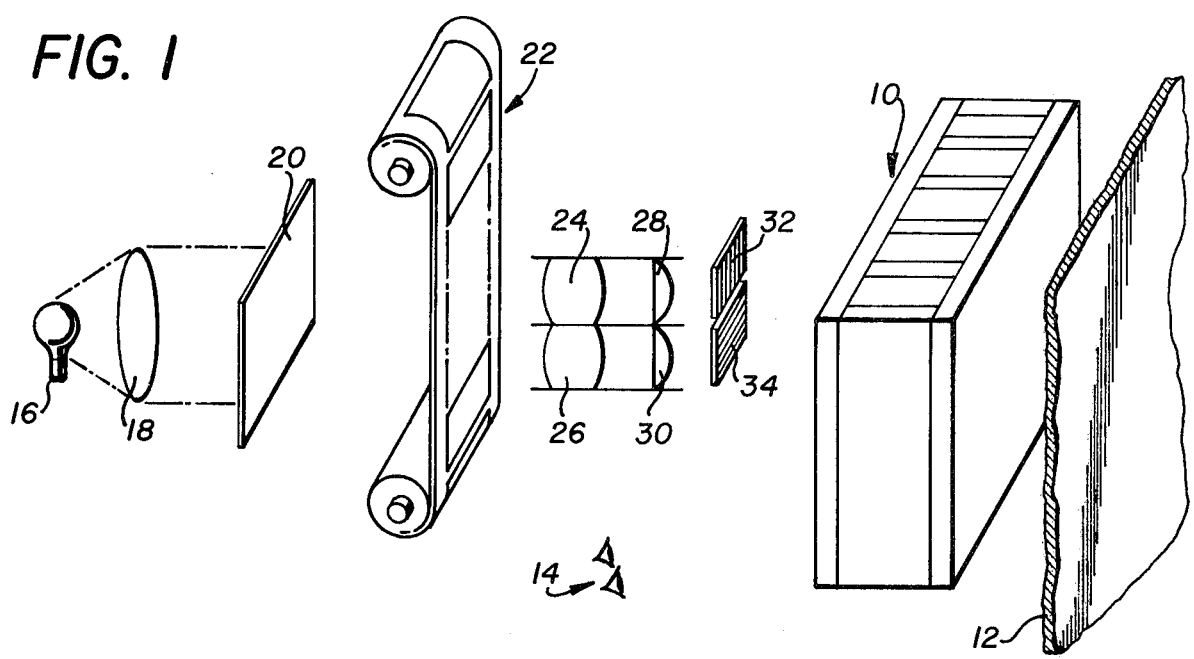
FIG. 1 shows a schematic view of an application of the invention to a film projection apparatus.
Figure 13:
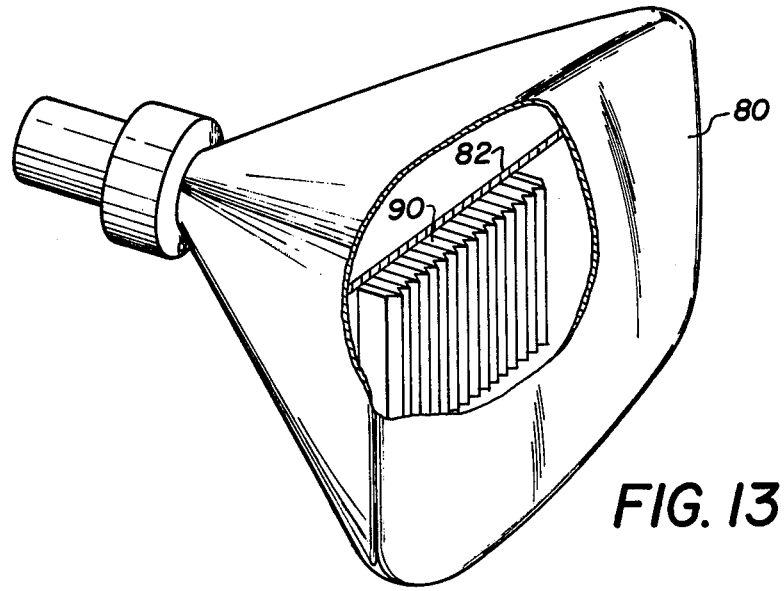
FIG. 13 illustrates a fragmentary perspective of the invention as used in a television screen application.
Figure 14:
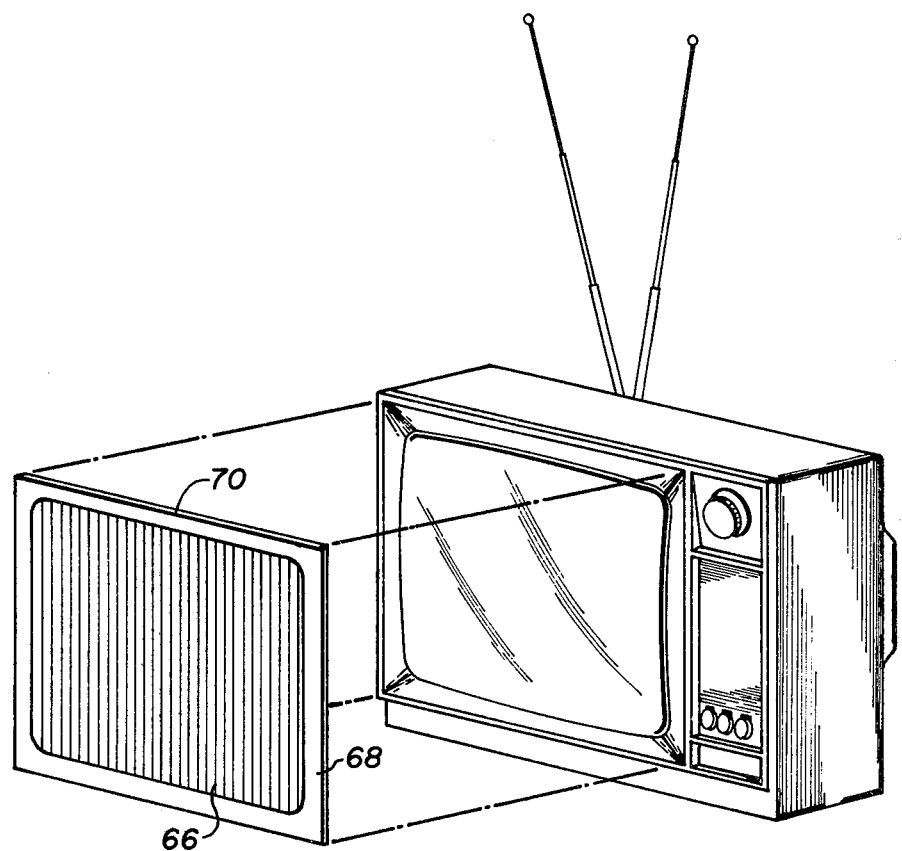
FIG. 14 shows a schematic representation of the means for installing an apparatus of the invention on a conventional television viewing screen.

With reference to FIG. 1, the optical screen 10 is shown positioned between a reflective screen 12 and the observer or viewer shown representatively at 14. In picture projection, light from a source 16 is projected through a lens 18 and a control filter 20, then through film 22. If desired, the image projected from film 22 may be sectioned by filters 24, 26, 28 and 30. Filters 32 and 34, which may be polarizing filters, may also be employed to further separate the image perceived by observer 14; however, the use of polarized light is not required with screen 10 of the invention except in the instance of the embodiment shown in FIG. 6, to be discussed. As the images from film 22 are reflected by screen 12, they pass through optical screen 10, which provides or enhances image separation and contrast to produce an apparent three-dimensional image for the observer 14. Such results may similarly be achieved with a television image, as shown in FIGS. 13 and 14, to be discussed further herein.

FIG. 2 shows an enlarged edge view of the optical screen 10 in FIG. 1. The screen comprises vertically oriented courses of clear transparent material 36, which may be of glass, plastic polycarbonate, polyvinyl, cellulose acetate or similar clear, essentially colorless transparent materials. The "vertical" orientation of the courses refers to their normal orientation before a seated observer. Between courses 36 are located vertically oriented louvers or filters 38 of an actinic transparent material, preferably orange or amber in color, which may be of materials similar to those used for the courses 36 except for color. Other colors which provide a suitable actinic effect are yellow, magenta, red, mauve, and violet; however, additional colors could be used without departing from the spirit of this invention, so long as the desired image color contrast is obtained. Abutting courses 36 and 38 on both sides are clear transparent cover sheets 40 and 42 of like materials. The cover sheets may be glossy or matte finish as desired in a particular application and additionally may be tinted a neutral gray, for example, for glare reduction.

A working model of the screen 10 as shown in FIG. 1 has been made and tested with satisfactory results. Courses 36 were 0.020" wide across the screen 10 and 0.020" thick; courses 38, 0.003" wide and 0.020" thick; and cover plates 40 and 42, 0.005" thick. One skilled in the art will realize, however, that the widths and thicknesses of the various elements may be adjusted within the teachings of this invention to produce varied levels of contrast enhancement and image separation in use. The vertically oriented louvers or filters 38 may be placed at angles other than 90° to the cover plates to provide a controlled viewing area, anti-reflection properties and related effects.

In some applications, the filters 38 may be of semi-transparent, opaque-reflective or absorbitive material. Semi-transparent filters may be used as a means of reducing overall screen brightness. If the television screen or other source were being viewed in a darkened area such as an aircraft cockpit or ship's fire control center, such reduced brightness would be desirable. Opaque-reflective material could be used in applications where it is desirable to provide multiple internal reflections of the viewing screen or to provide the capability of seeing both the transmitted image together with some other image reflected from a different point behind or at an angle to the viewer. Where either semi-transparent reflective filters or opaque reflective filters are used, an application would be in a rear view mirror for automobiles or aircraft which would enable the operator to selectively view either a rear view image or to look right through the mirror for a forward view with only a slight eye or head movement. An automotive rear view mirror made in this manner would provide a selective reduced-glare view to the rear, but would not obscure the driver's forward vision. Moreover, such a mirror could be affixed directly to the windshield without the need for a bracket, angle adjustment device or day/night anti-glare adjustment.

The invention functions in essentially the following manner. The optical screen 10 is placed in front of the image to be viewed by the observer 14, oriented so that the lines formed by the louvers or filters 38 are vertical to the observer. As the observer looks at the screen normally, the eyes perceive two slightly separated images due to the action of the screen, which, combined with the natural separation of the eyes, results in a simulated stereoscopic or three-dimensional effect. Using conventional ray analysis, one may trace a single ray from one eye of the observer through the cover sheet 40 and into the clear transparent course 36. At some point, depending on the width of the course 36, the ray will strike one or more of the louvers or filters 38. A first portion of the ray will pass through the filter at changed luminance due to the effect of the filter, and eventually pass through cover sheet 40 to the image to be received.

A second portion of the ray will simultaneously be reflected from the surface of the filter 38 and proceed through the remaining portion of course 36 to pass through the cover sheet 42 at a different location from the first portion. Thus, the eye of the observer sees that portion of the image as being increased in contrast due to the changed luminance of a portion of the ray by the actinic filter 38 and as having a slight distortion due to the internal reflections occurring. The same effect occurs at the other eye of the observer simultaneously, though each eye sees the same portion of the image from a slightly different position. This combined contrast enhancement and controlled distortion is perceived by the brain as a third dimensional visual cue which, combined with actual dimensional cues of the image, produces a simulated three-dimensional image to the observer.

FIG. 3 discloses a modification of the embodiment of FIG. 3 wherein cover sheet 40 has been replaced by vertically oriented lenticules 44 which may be embossed or molded into the surface of the optical screen 10, to provide a lens pattern centered on courses 36 and in registration with, or having its parallel grooves or valleys 46 centered over, filters 38. The lenticular lenses provide a further controlled distortion of the transmitted image in the plane of the lens pattern, thereby enhancing the simulated three-dimensional effect. Such distortion is discussed in U.S. Pat. No. 3,366,736 granted to A. A. Snaper, co-inventor herein. In FIG. 4, cover plate 40 has also been replaced by vertically oriented lenticules 44; however, the lenticules are offset from registration with filters 38 to provide a different degree of controlled distortion. The peaks 48 of the lenticules may be centered on filters 38 as shown or offset a different amount, depending on the amount of distortion required for a particular application. The dimensions discussed with regard to FIG. 2 have been used successfully with these embodiments.

FIG. 5 shows a planar optical lens which exhibits the light dispersing characteristics of a Fresnel type lens without requiring the use of raised lenticules or ridges on the lens surface, through lenticules as in FIGS. 3 and 4 may be used to enhance dispersion if needed. The lens comprises vertically oriented courses of clear transparent material 50, of the same material as element 36 in FIG. 2. Between courses 50 are located vertically oriented louvers 52 of a clear transparent material having an index of refraction different from that of courses 50, the magnitude of the difference being a function of the amount of light dispersion desired. Cover sheets 54 and 56 are placed as shown and may be of the same or different index of refraction. Using the same dimensions discussed with regard to FIG. 2, satisfactory results have been achieved with an index of refraction of 1.46 in courses 50 (made from cellulose acetate butyrate and of 1.53 in louvers 52 made from vinyl chloride acetate. This embodiment of the invention eliminates the raised lenticules of the Fresnel lens and their attendant problems of breakage and soil while providing similar optical characteristics. The mode of operation of the embodiment is as discussed with regard to FIG. 2 except that no appreciable change in luminance is experienced by the first portion of the ray as it passes through the louver 52, all distortion or dispersion being due to the differences in index of refraction of the materials used.

Figure 6:
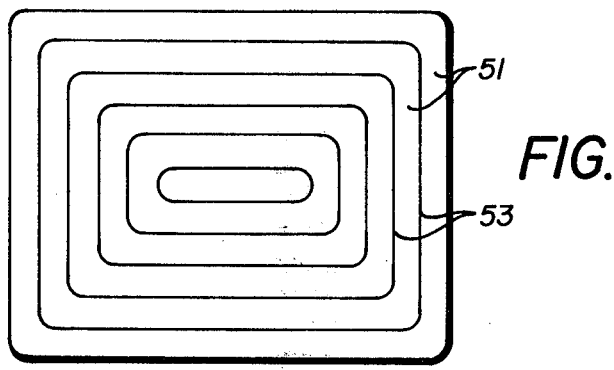
FIGS. 6 and 7 show plan view of alternate embodiments of the lens of FIG. 5.
Figure 7:
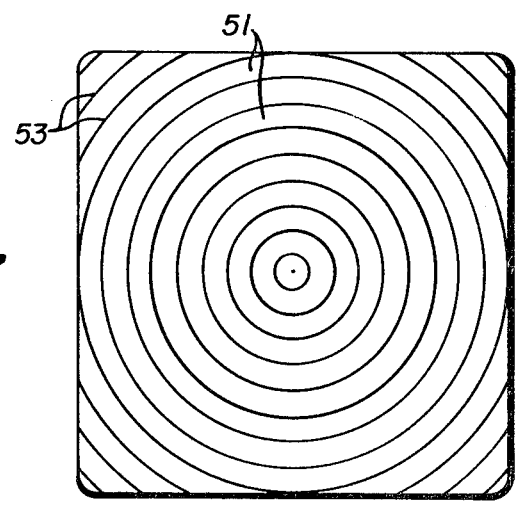

FIGS. 6 and 7 show plan views of alternate embodiments of the planar optical lens of FIG. 5 in which the courses of clear transparent material 51 and the louvers of clear transparent material 53 having a different index of refraction are arranged in concentric patterns to achieve the desired light dispersion. Of course, the pattern of the transparent courses and louvers may be varied to achieve different effects without departing from the spirit of this invention.

Figure 8:
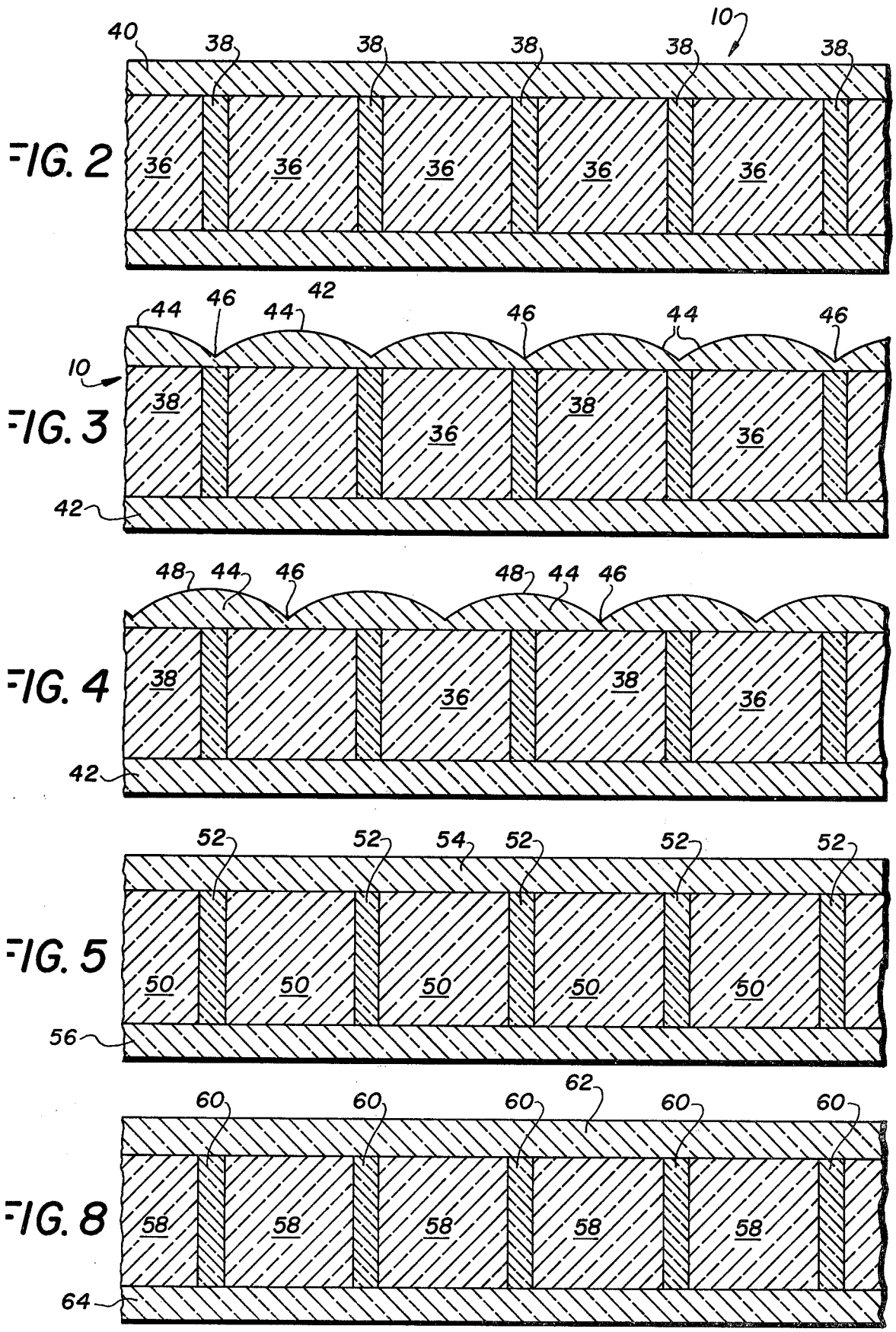
FIG. 8 shows an enlarged edge view of a planar optical lens including birefringent material in accordance with the invention.

FIG. 8 discloses a planar optical lens comprising birefringent louver or filter elements which provide color conversion thereby permitting use of the lens for production of a simulated three-dimensional image similar to that produced by the apparatus of FIG. 2. The lens comprises vertically oriented courses of clear transparent material 58, of the same material as element 36 in FIG. 2. Between courses 58 are located vertically oriented louvers 60 of birefringent materials having uniform optical and stress characteristics, such as polymerized ethylene, celluloid, Cellophane, calcium carbonate and siliconoxide quartz. Abutting courses 58 and louvers 60 on both sides are clear transparent cover sheets 62 and 64 of material similar to courses 58.

The principles of the use of birefringent materials for color conversion and generation are explained more fully in U.S. Pat. Nos. 3,391,296 and 3,488,105 granted to A. A. Snaper, co-inventor herein. When the lens is transmitting a polarized light image, even black and white, the output will include colors determined by the specific properties such as the thickness and state of stress of the birefringent louver or filter 60 or pattern of such materials intersected by a specific portion of the transmitted image. By using a plurality of birefringent materials arranged in louvers 60, it is possible to transmit one or more colors simultaneously. By placing an appropriate filter or analyzer plate on the output side of such a lens, selected colors may be permitted to pass or only white light and a color which contrasts sufficiently with white light to heighten image separation in a manner analagous to the device shown in FIG. 2. The color produced need not bear any relation to the true color of the scene transmitted, unless the scene is modulated and positioned so that the true color coincides with the transmitted color. Thus, if the scene transmitted in black and white is actually a red one and the color produced is red, then the viewer will see a red image on a black and white receiver. Satisfactory results have been obtained using the same dimensions discussed with regard to FIG. 2 and a birefringent material such as Cellophane to produce a preferred color for contrast for simulated three-dimensional viewing.

Figure 9:
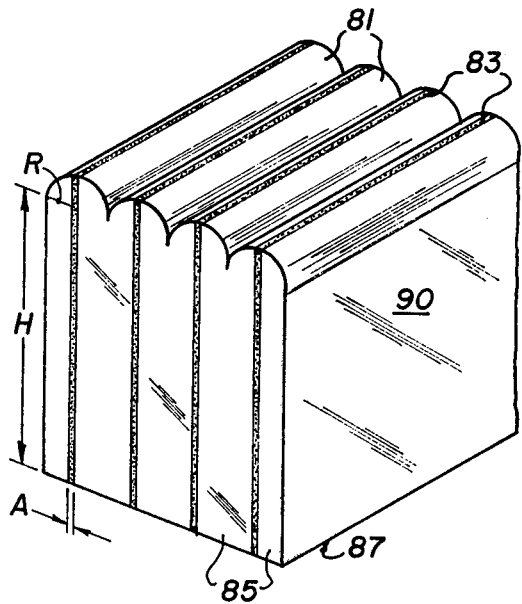
FIG. 9 illustrates an enlarged, detailed view in perspective of another screen form of the invention.

In FIGS. 9 through 12 are shown an alternative lenticular screen 90 in enlarged detail in various embodiments. In FIG. 9 is shown an arcuate lenticular screen having height H measured perpendicularly, or vertically from the face 87. Face 87 is connected, in the mode of operation which will be described in more detail, to the reflective screen 12 shown in FIG. 1. This screen varies from the previously described embodiments in not using cover sheets or plates. Instead, the rough lenticular face or surface of the transparent materials or courses used exposed, at least on the surface facing the observer. The screen is formed of a pattern of plural arc ridges having radii R, the entire length of the screen on a rough lenticular face opposite the relatively smooth face 87, as shown. From the apex or highest point of each arc ridge, a filter or louver 83 having width A is positioned to run the perpendicular or vertical length H plus R to face 87. There is a color filter 83 for each arc formation in the lenticular screen. It has been found that using actinic material for the filters greatly enhances the image separation. The sections 85 are preferably made of clear, transparent material of either glass or a suitable plastic. The colored filters 83 are, therefore, preferably made of a compatible actinic plastic which is tinted in color as previously described, preferably tinted amber. The lenticular screen, as can be seen not only in FIG. 9, but also in FIGS. 10 through 12, thus becomes a laminar structure having alternate clear transparent sections and the color filters.

Figure 10:
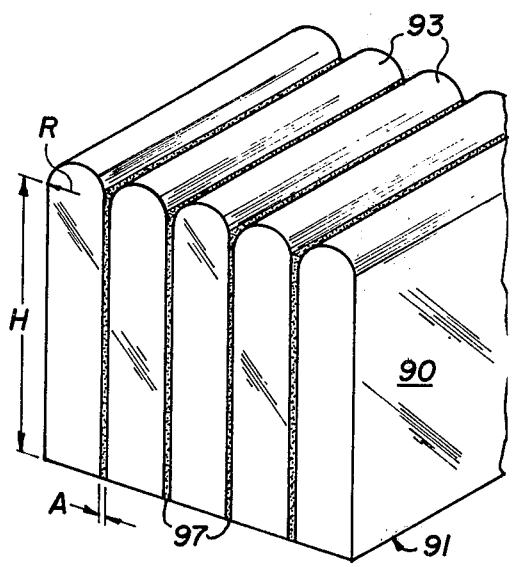
FIG. 10 illustrates an alternative embodiment of the screen of FIG. 9.

An alternate construction of the lenticular screen 90 to the structure of FIG. 9 is shown in FIG. 10, wherein H represents the vertical distance perpendicular to a face 91, and A represents the width or thickness of an amber actinic filter 97.

The filters 97 in this embodiment are positioned vertically from the troughs formed on the rough lenticular face by the adjoining arc ridges of the clear transparent sections 93, to the opposite face 91 which is connected to the reflective screen 12. Again, there is a filter section 97 for each clear transparent section 93, as shown.

Figure 11:
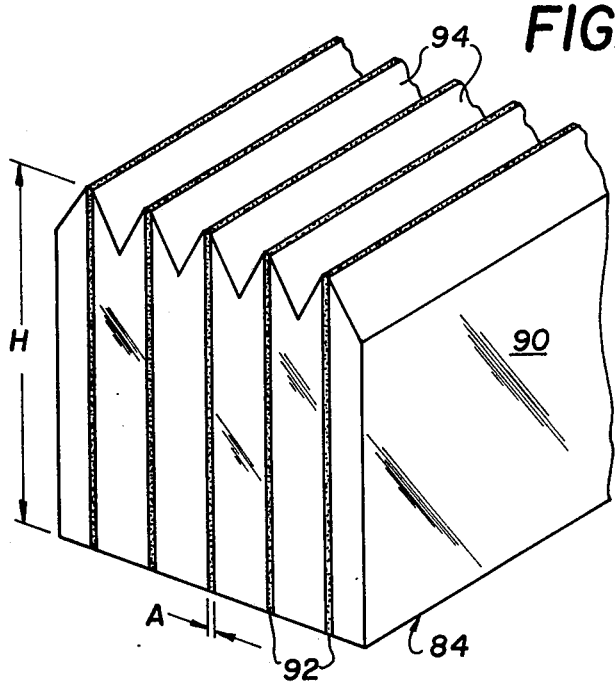
FIG. 11 illustrates another alternative embodiment of the screen of the invention.

A third alternate embodiment for the lenticular screen 90 is shown in FIG. 11. Instead of an arcuate formation on the rough lenticular face louvered ridges are formed as shown. The louvered ridges have a triangular shape in cross-section. The amber actinic filters 92 are placed so as to run from the apex of the louvered shaped ridges vertically to the opposite face 84, which is positioned adjacent the reflective screen 12. The width of the filters 92 is designated as A. The vertical height of the lenticular screen is designated as H. The clear transparent sections 94 are positioned between the filters 92.

Figure 12:
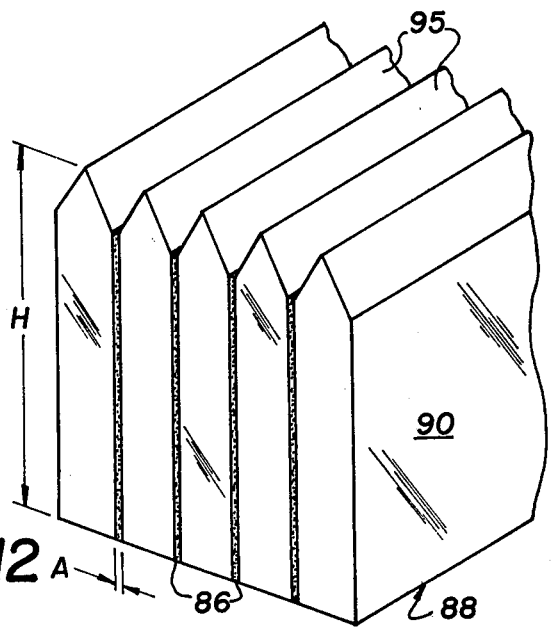
FIG. 12 illustrates yet another alternative embodiment of the screen of the invention.

Yet a fourth alternate construction embodiment for the lenticular screen 90 is illustrated in FIG. 12. The vertical height of the screen is represented as H, as measured perpendicularly from the face 88 attached to the reflective screen 12. The amber actinic filters 86 are positioned between the clear transparent sections 95. The rough lenticular face opposite the face 88 is formed of a pattern of triangular shaped louvered ridges running adjacent and parallel each other. The filters 86 are laminally positioned so to run from the bases of the louvered ridges, or from the trough at the junction of adjacent parallel ridges through the screen to the opposite face 88.

The laminate optical viewing apparatus shown in FIGS. 2 to 12 may be manufactured in accordance with known techniques, such as that discussed in Brochure No. BLTDF1 (92.3)MP, available from the Display Film Products Division of the Minnesota Mining and Manufacturing Company, Saint Paul, Minn. 55101 for very thin screens and lenses such as used on television sets; or in "Hycontrast Image Enhancer", available from Acton Industries, Inc. subsidiary of McDonnell-Douglas Corp., Monrovia, Calif. 91016, for heavier section screens as might be used on large motion picture screens.

FIGS. 13 and 14 show means for applying the embodiment of FIGS. 2 to 11 in a conventional television screen. For example, in FIG. 13, the lenticular screen 90 is superposed onto and in direct contact with the phosphorescent screen 82 within the television tube 80. While in both FIGS. 11 and 13 the lenticular screen 90 is shown as having louvered shaped ridges, it is to be understood that comparable and satisfactory results can be achieved by using any of the alternative screen construction embodiments shown in FIGS. 2–12. Another, and more readily adaptable means for using the screens of the invention with the television is shown in FIG. 14. A planar optical screen 66 is attached to the front of the television receiver screen by means of an attached peripheral mask 68 of flat, black non-reflective material which conforms to the frame or case of the television screen and serves to increase the apparent separation of the television screen and optical screen from ambient room illumination. The combined optical screen 66 and mask 68 may be attached to the television receiver by any suitable means such as a double-sided adhesive strip located on the periphery 70, of the mask so as to contact the frame or case of the television set. The screen may also be attached by friction fit between the frame of the viewing screen and the frame of the television screen. The optical screen may be provided with folding extensions, preferably of non-reflective black material, which may be folded to position the screen at some distance from the television screen and yet to provide a shield to prevent extraneous light from entering the space between the optical screen and the television screen. Again, any of the screen embodiments shown in FIGS. 2–12 may be used for screen 66. These as well as other uses and modifications within the purview of the invention will be evident to those skilled in the art.

We claim:

1. An image projection apparatus including a lenticular screen having at least one lenticular face thereon, said screen comprising:
    (a) A plurality of clear transparent sections; and
    (b) a plurality of actinic filter sections laminately positioned alternately of said clear transparent sections, said filter sections being positioned at an angle to said lenticular face.

2. The apparatus as claimed in claim 1, wherein said filter sections comprise amber actinic filter means.

3. The apparatus as claimed in claim 2, wherein said lenticular face comprises a pattern of parallel arcuate ridges, and wherein at least one of said actinic filter sections intersects said irregularly formed face at the apex of each of said arcuate ridges.

4. The apparatus as claimed in claim 2, wherein said lenticular face comprises a pattern of parallel arcuate ridges, and wherein at least one of said actinic filter sections intersects said irregularly formed face at the trough between adjacent parallel arcuate ridges.

5. The apparatus as claimed in claim 2, wherein said lenticular face comprises a pattern of parallel louvered ridges, and wherein at least one of said actinic filter sections intersects said irregularly formed face at apex of said louvered ridges.

6. The apparatus as claimed in claim 2, wherein said lenticular face comprises a pattern of parallel louvered ridges, and wherein at least one of said actinic filter sections intersects said irregularly formed face at the trough between adjacent parallel louvered ridges.

7. A planar optical viewing apparatus comprising:
    (a) a first sheet of clear, transparent material;
    (b) a plurality of courses of clear transparent material; and
    (c) a plurality of filters of actinic transparent material laminately positioned alternately of the clear transparent courses, the actinic transparent filters and the clear transparent courses being positioned at an angle to the clear transparent sheet.

8. The apparatus as claimed in claim 7, wherein said actinic transparent filters comprise filters selected from the group of amber, magenta, red, mauve and violet filters.

9. The apparatus as claimed in claim 7, further including:
    (d) a second sheet of clear transparent material positioned at an angle to the transparent actinic filters and the clear transparent courses, the second sheet comprising a pattern of lenticular lenses in registration with the actinic transparent filters.

10. The apparatus as claimed in claim 7, further including:
    (d) a second sheet of clear transparent material positioned at an angle to the transparent actinic filters and the clear transparent courses, the second sheet comprising a pattern of lenticular lenses offset from registration with the actinic transparent filters.

11. The apparatus of claim 7, wherein the actinic filters are semi-transparent.

12. The apparatus of claim 7, further comprising:
    (d) mask means adapted for surrounding the periphery of the planar viewing apparatus for attaching the apparatus to a conventional television screen.

13. A planar optical viewing apparatus comprising:
    (a) a first plurality of courses of clear transparent material having a first index of refraction; and
    (b) a second plurality of courses of clear transparent material having a second index of refraction laminately positioned alternately of the first plurality of courses to provide a thin, planar viewing apparatus.

14. The apparatus as claimed in claim 7 wherein the first and second pluralities of clear transparent courses are arranged in a concentric pattern.

15. A planar optical viewing apparatus comprising:
    A. a first plurality of courses of clear transparent material; and
    B. a second plurality of courses of birefringent material laminately positioned alternately of the first plurality of courses to provide a thin, planar viewing apparatus.

* * * * *